US012640783B2

(12) United States Patent
Bahadori et al.

(10) Patent No.: US 12,640,783 B2
(45) Date of Patent: May 26, 2026

(54) BEAMFORMING IN WIRELESS NETWORKS VIA SPLIT COMPUTING

(71) Applicants: Northeastern University, Boston, MA (US); The Regents of the University of California, Oakland, CA (US)

(72) Inventors: Niloofar Bahadori, Portland, ME (US); Francesco Restuccia, Boston, MA (US); Marco Levorato, Irvine, CA (US); Yoshitomo Matsubara, Irvine, CA (US)

(73) Assignees: Northeastern University, Boston, MA (US); The Regents of the University of California, Oakland, CA (US)

( * ) Notice: Subject to any disclaimer, the term of this patent is extended or adjusted under 35 U.S.C. 154(b) by 38 days.

(21) Appl. No.: 18/848,814

(22) PCT Filed: Apr. 4, 2023

(86) PCT No.: PCT/US2023/065300
§ 371 (c)(1),
(2) Date: Sep. 19, 2024

(87) PCT Pub. No.: WO2023/196794
PCT Pub. Date: Oct. 12, 2023

(65) Prior Publication Data
US 2025/0219686 A1 Jul. 3, 2025

Related U.S. Application Data

(60) Provisional application No. 63/362,524, filed on Apr. 5, 2022.

(51) Int. Cl.
*H04B 7/0456* (2017.01)

(52) U.S. Cl.
CPC .................................. *H04B 7/0456* (2013.01)

(58) Field of Classification Search
CPC .... H04B 7/0456; H04B 7/0617; H04B 7/063; H04B 7/0658; G06N 3/02
(Continued)

(56) References Cited

U.S. PATENT DOCUMENTS 10,348,386 B1 * 7/2019 Nammi ................ H04B 7/0456

OTHER PUBLICATIONS

International Search Report and Written Opinion for Int'l Application No. PCT/US2023/065300, Date of Mailing: Jul. 19, 2023.
(Continued)

*Primary Examiner* — Fitwi Y Hailegiorgis
(74) *Attorney, Agent, or Firm* — Hamilton, Brook, Smith & Reynolds, P.C.

(57) ABSTRACT

A wireless communications network transmits beamformed signals via compressed beamforming feedback. A transmitter generates beamformed signals and omnidirectional signals. A receiver, communicatively coupled to the transmitter via a wireless channel, generates channel state information (CSI) based on a received signal from the transmitter; generates, via a first neural network (NN), a compressed representation of beamforming feedback as a function of the CSI; and transmits the compressed representation to the transmitter via the wireless channel. The transmitter then determines, via a second NN, the beamforming matrix as a function of the compressed representation; and generates a subsequent beamformed signal toward the receiver as a function of the beamforming matrix.

21 Claims, 9 Drawing Sheets

(58) Field of Classification Search

USPC .......................................................... 375/267

See application file for complete search history.

(56) References Cited

OTHER PUBLICATIONS

Guo, J. et al., "Deep Learning-Based CSI Feedback for Beamforming in Single- and Multi-Cell Massive MIMO Systems," IEEE Journal on Selected Areas in Communications, vol. 39, No. 7: 1872-1884 (2021).

Matsubara, Y. et al., "BottleFit: Learning Compressed Representations in Deep Neural Networks for Effective and Efficient Split Computing," arxiv.org, Cornell University Library, Ithaca, NY, 10 pages (2022).

Sangdeh, P. K. et al., "LB-SciFi: Online Learning-Based Channel Feedback for MU-MIMO in Wireless LANs," 2020 IEEE 28th International Conference on Network Protocols (ICNP), 11 pages (2020).

Guo, J., et al., "Deep Learning-Based CSI Feedback for Beamforming in Single- and Multi-Cell Massive MIMO Systems" IEEE Journal on Selected Areas in Communications, vol. 39, No. 7, Nov. 11, 2020, 13 pages.

International Search Report and Written Opinion received for PCT Patent Application No. PCT/US23/65300, mailed on Jul. 19, 2023, 16 pages.

Matsubara, Y., et al., "BottleFit: Learning Compressed Representations in Deep Neural Networks for Effective and Efficient Split Computing", arxiv.org, Apr. 14, 2022, 10 pages.

Sangdeh, P.K., et al., "LB-SciFi: Online Learning-Based Channel Feedback for MU-MIMO in Wireless LANs", 2020 IEEE 28Th International Conference on Network Protocols (ICNP), Oct. 13, 2020, pp. 1-11.

Azizipour and Mohamed-Pour, "Compressed Channel Estimation for FDD Massive MIMO Systems Without Prior Knowledge of Sparse Channel Model," IET Communications, vol. 13, No. 6, pp. 657-663, 2019.

Cisco Inc., "Cisco Visual Networking Index (VNI) and VNI Service Adoption Global Forecast Update, 2016-2021." https://tinyurl.com/CiscoVNI2021, 2020.

Deng, et al., "IEEE 802.11be Wi-Fi 7: New Challenges and Opportunities," IEEE Communications Surveys & Tutorials, vol. 22, No. 4, pp. 2136-2166, 2020.

G. H. Golub and C. F. Van Loan, "Matrix computations. Johns Hopkins studies in the mathematical sciences," 1996.

Gast, 802.11ac: A Survival Guide: Wi-Fi at Gigabit and Beyond, O'Reilly Media, Inc., 2013.

Gringoli, et al., "Free Your CSI: A Channel State Information Extraction Platform for Modern Wi-Fi Chipsets," in Proceedings of the 13th International Workshop on Wireless Network Testbeds, Experimental Evaluation & Characterization, pp. 21-28, 2019.

Hassan, et al., "Performance Analysis and Joint Statistical Beamformer Design for Multi-User MIMO Systems," IEEE Communications Letters, vol. 24, No. 10, pp. 2152-2156, 2020.

IEEE-802.11ac, "IEEE Standard for Information Technology Local and Metropolitan Area Networks Part 11: Wireless LAN Medium Access Control (MAC) and Physical Layer (PHY) Specifications Amendment 5: Enhancements for Higher Throughput," 2013.

IEEE-802.11ax, "IEEE Standard for Information Technology Telecommunications and Information Exchange Between Systems Local and Metropolitan Area Networks Specific Requirements. Part 11: Wireless LAN Medium Access Control (MAC) and Physical Layer (PHY) Specifications. Amendment 1: Enhancements for High Efficiency WLAN," pp. 1-765, 2021.

Kingma and Ba, "Adam: A Method for Stochastic Optimization," in Third International Conference on Learning Representations, 2015.

Li, et al., "3D Beamforming for Large-Scale FD-MIMO Systems Exploiting Statistical Channel State Information," IEEE Transactions on Vehicular Technology, vol. 65, No. 11, pp. 8992-9005, 2016.

Liang, et al., "Deep Learning and Compressive Sensing-Based CSI Feedback in FDD Massive MIMO Systems," IEEE Transactions on Vehicular Technology, vol. 69, No. 8, pp. 9217-9222, 2020.

Liu, et al., "Downlink MIMO in LTE-Advanced: SU-MIMO vs. MU-MIMO," IEEE Communications Magazine, vol. 50, No. 2, pp. 140-147, 2012.

Lu, et al., "MIMO Channel Information Feedback Using Deep Recurrent Network," IEEE Communications Letters, vol. 23, No. 1, pp. 188-191, 2018.

Mashhadi, et al., "Distributed Deep Convolutional Compression for Massive MIMO CSI Feedback," IEEE Transactions on Wireless Communications, vol. 20, No. 4, pp. 2621-2633, 2020.

Matsubara, et al., "Split Computing and Early Exiting for Deep Learning Applications: Survey and Research Challenges," arXiv preprint arXiv:2103.04505v4, 2021.

Mellor, et al., "Neural architecture search without training," in International Conference on Machine Learning, pp. 7588-7598, PMLR, 2021.

Metzler, et al., "From Denoising to Compressed Sensing," IEEE Transactions on Information Theory, vol. 62, No. 9, pp. 5117-5144, 2016.

Monteiro, et al., "Massive Wireless Energy Transfer with Statistical CSI Beamforming," IEEE Journal of Selected Topics in Signal Processing, 2021.

Oteri, et al., "Overhead Reduction in 802.11be," document IEEE 802.11-19/0391r0. Mar. 2019.

Perahia and R. Stacey, Next Generation Wireless LANs: 802.11n and 802.11ac. Cambridge university press, 2013.

Wen, et al., "Deep Learning for Massive MIMO CSI Feedback," IEEE Wireless Communications Letters, vol. 7, No. 5, pp. 748-751, 2018.

Xiong, et al., "Resource Constrained Neural Network Architecture Search: Will A Submodularity Assumption Help?," in Proceedings of the IEEE/CVF International Conference on Computer Vision, pp. 1901-1910, 2019.

Zhang, et al., "Sum-rate analysis for massive mimo downlink with joint statistical beamforming and user scheduling," IEEE Transactions on Wireless Communications, vol. 16, No. 4, pp. 2181-2194, 2017.

* cited by examiner

NDP: NULL DATA PACKET
BPR: BEAMFORMING REQUEST POLL
BMR: BEAMFORMING MATRIX REPORT

GENERATE CHANNEL STATE INFORMATION (CSI)
705

GENERATE COMPRESSED REPRESENTATION OF BF
710

TRANSMIT COMPRESSED REPRESENTION
715

DETERMINE BEAMFORMING MATRIX
720

GENERATE BEAMFORMED SIGNAL
725

700

BEAMFORMING IN WIRELESS NETWORKS VIA SPLIT COMPUTING

RELATED APPLICATIONS

This application is the U.S. National Stage of International Application No. PCT/US2023/065300, filed on Apr. 4, 2023, which designates the U.S., published in English, and claims the benefit of U.S. Provisional Application No. 63/362,524, filed on Apr. 5, 2022. The entire teachings of the above applications are incorporated herein by reference.

GOVERNMENT SUPPORT

This invention was made with government support under Grant Numbers 2120447 and 2134567 awarded by the National Science Foundation. The government has certain rights in the invention.

BACKGROUND

Today, Wi-Fi networks are used to connect hundreds of millions of people worldwide. Wi-Fi is so ubiquitous that cellular operators are expected to offload 63% of their traffic to Wi-Fi by 2022. To attest to the need for higher data rates, the IEEE is currently standardizing 802.11be (Wi-Fi 7), which will support throughput of up to 46 Gbps through wider signal bandwidths and the usage of multi-user multiple-input and multiple-output (MU-MIMO) techniques. MU-MIMO will become fundamental also to effectively decongest the unlicensed spectrum bands through spatial reuse, which are increasingly saturated. To correctly beamform transmissions, MU-MIMO requires access points (APs) to periodically collect channel state information (CSI) from each connected station (station) to beamform the transmissions. According to the IEEE 802.11 standard, the beamforming feedback (BF) is constructed by (i) measuring the CSI through pilot signals and (ii) computing the BF through singular value decomposition (SVD). Then, the BF is decomposed into Givens rotation (GR) angles that produce the beamforming matrix (BM).

SUMMARY

Example embodiments include a wireless communications network. A transmitter may be configured to generate beamformed signals and omnidirectional signals. A receiver may communicatively coupled to the transmitter via a wireless channel and may be configured to 1) generate channel state information (CSI) based on a received signal from the transmitter; 2) generate, via a first neural network (NN), a compressed representation of beamforming feedback as a function of the CSI; and 3) transmit the compressed representation to the transmitter via the wireless channel. The transmitter may then determine, via a second NN, the beamforming matrix as a function of the compressed representation; and generate a subsequent beamformed signal toward the receiver as a function of the beamforming matrix.

The first and second NNs may each operate a distinct subset of a common NN model, the common NN model being configured to output the beamforming matrix in response to an input comprising the CSI. The distinct subsets of the common NN model may include 1) a first subset configured to output the compressed representation in response to an input comprising the CSI, and 2) a second subset configured to output the beamforming matrix in response to an input comprising the compressed representation. The common NN model may include an intermediate layer between the distinct subsets, the intermediate layer outputting the compressed representation in response to an input comprising the CSI.

The transmitter may be further configured to update a beamforming configuration based on the beamforming matrix, and may generate the subsequent beamformed signal via an antenna array. The transmitter may generate the subsequent beamformed signal via a multiple-input and multiple-output (MIMO) process. The compressed representation may be less than 50% of the data size of the beamforming feedback. The received signal may be an omnidirectional signal or a beamformed signal.

Further embodiments include a method of wireless communication. At a receiver communicatively coupled to a transmitter via a wireless channel, channel state information (CSI) may be generated based on a received signal from the transmitter. Via a first neural network (NN), a compressed representation of beamforming feedback may be generated as a function of the CSI. The compressed representation may then be transmitted to the transmitter via the wireless channel. At the transmitter, the beamforming matrix may be determined via a second NN as a function of the compressed representation. Via a second NN, the beamforming matrix may be determined as a function of the compressed representation. A subsequent beamformed signal may then be generated toward the receiver as a function of the beamforming matrix.

Further embodiments include a network transmitter. A transceiver may be configured to generate a beamformed signal toward a receiver, and receive a compressed representation of beamforming feedback from the receiver, the compressed representation being a function of channel state information (CSI) determined by the receiver. A neural network (NN) may be configured to generate the beamforming matrix as a function of the compressed representation. The transceiver may be further configured to generate a subsequent beamformed signal toward the receiver as a function of the beamforming matrix.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows. The teachings of all patents, published applications and references cited herein are incorporated by reference in their entirety.

A key challenge in MIMO systems is that the size of the beamforming feedback (BF) grows with the number of subcarriers, transmitting and receiving antennas. For example, in an 8×8 network at 160 MHz of bandwidth, the BF in 802.11 will be of size (486 subcarriers×56 angles/subcarrier×16 bits/angle=) 435,456 bits≈54.43 kB, if the maximum angle resolution is used. If BFs are sent back every 10 ms, the airtime overhead is 435,456/0.01≈43.55 Mbit/s. Moreover, the BF computation imposes a significant burden on the stations, which may become intolerable for low-power devices. Specifically, the complexity of SVD and GR are:

$$O\big((4N_tN_r^2 + 22N_t^3)\cdot S\big)$$

and $$O(N_t^3N_r^3S)$$

wherein $N_t$, $N_r$, and S denote the number of transmitting and receiving antennas and subcarriers. Because Wi-Fi 7 will support more spatial streams (up to 16) and bandwidth (up to 320 MHz), a thorough revision of how MIMO is performed in Wi-Fi is essential to keep the complexity under control.

Existing approaches to reduce MIMO complexity come with excessive computation overhead and/or performance loss, with most of them not being compliant to the IEEE 802.11 standard. Example embodiments, described below, take a different approach, providing an IEEE 802.11 standard-compliant framework leveraging split computing to drastically decrease both computational load and BF size while maintaining reasonable beamforming accuracy.

Figure 1:
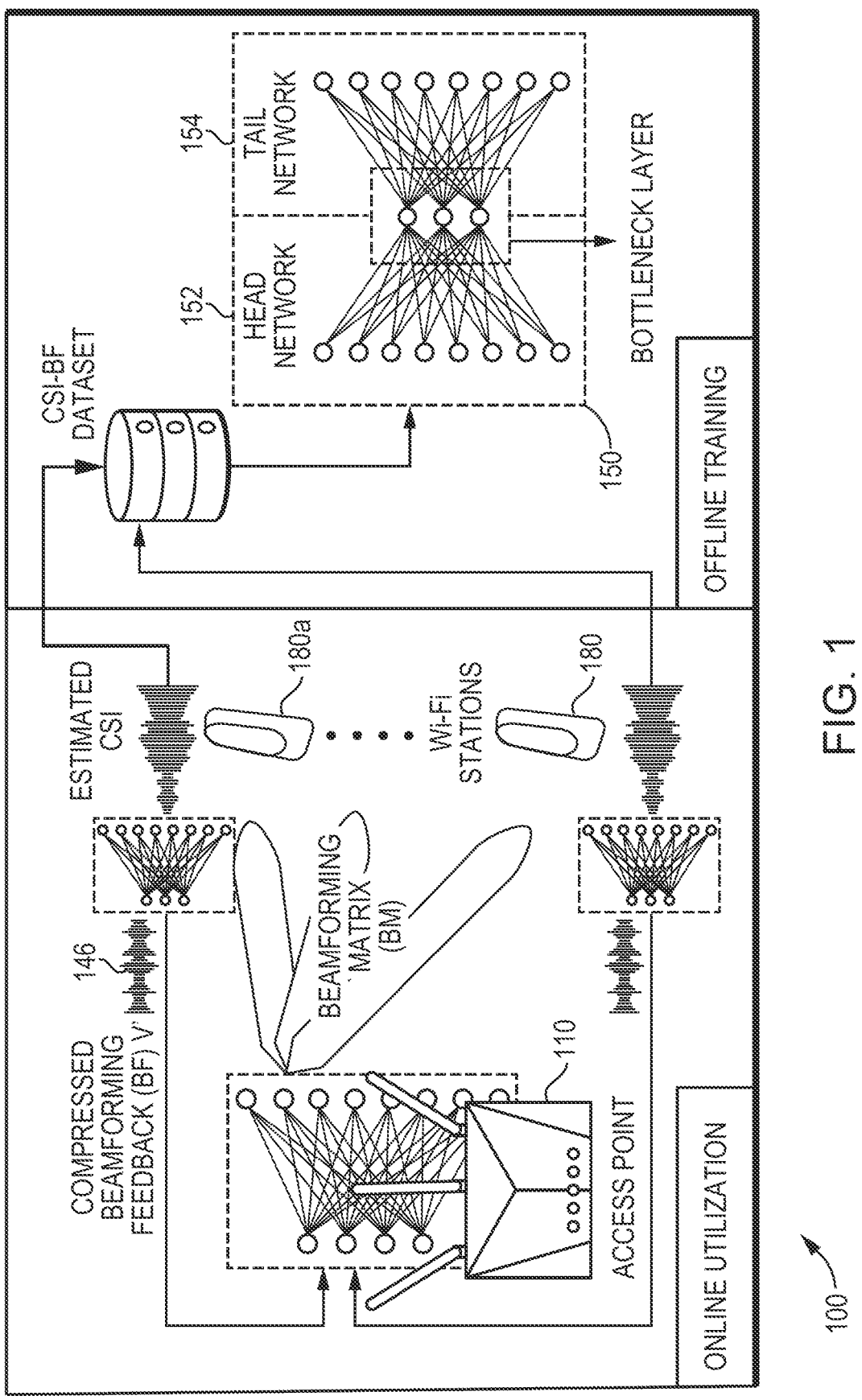
FIG. 1 is a diagram of a network in one embodiment.

FIG. 1 provides a high-level overview of a network 100 in an example embodiment. Here, a deep neural network (DNN) model 150 is trained to map an estimated CSI matrix to the beamforming feedback (BF) 146 in a supervised manner. The DNN 150 is "split" into first and second NN models, referred to as a head model 152 and a tail model 154, respectively executed by the stations 180 (e.g., smartphones, laptops, and/or other computing devices, also referred to as receivers) and by the access point 110 (e.g., a wireless router, also referred to as the transmitter). The head model 152 can be trained, offline, to produce a compressed representation of the BF through the introduction of a "bottleneck" inside the model, thus reducing BF airtime and station computational load.

An advantage of example embodiments is that the complexity of the head model and the BF representation size can be adjusted by modifying the bottleneck placement and size. Indeed, the bottleneck can trade off computational load, feedback size and beamforming accuracy, which was not available in previous approaches. This is crucial for constrained Wi-Fi devices and systems, which will cater to heterogeneous devices with different processing capacities.

Example embodiments provide a novel framework for BF compression and station computation reduction in MU- MIMO Wi-Fi networks. A complexity analysis, described below, shows that example embodiments successfully reduces the station computational load and the BF size by respectively 92% and 91% when compared to the standardized 802.11 algorithm.

A bottleneck optimization problem (BOP) is formulated below to determine the bottleneck placement and size with the goal of minimizing airtime and computation overhead, while ensuring that the bit error rate (BER) and end-to-end delay are below the application's desired level. Given its complexity, a heuristic algorithm is introduced, and a customized training procedure for the resulting DNN is described herein.

Example embodiments may leveredge off-the-shelf Wi-Fi equipment to collect CSI data in two different propagation environments, and the performance of example embodiments can be compared favorably with IEEE 802.11ac/ax CSI feedback algorithm (henceforth called 802.11) and the state-of-the-art DNN-based compression technique, LB-SciFi. Example embodiments have been demonstrated to reduce computational load and feedback size by up to 84% and 81% with respect to 802.11. Also, with the same compression rate, the computational load is reduced by up to 89% compared to LB-SciFi.

Example embodiments may be synthesized in field-programmable gate array (FPGA) hardware by using a customized library to show the feasibility of such embodiments in real-world Wi-Fi systems. Our experimental results show that the maximum end-to-end latency incurred by example embodiments is less than 7 milliseconds (ms) in the case of 4×4 MIMO operating at 160 MHz and lowest compression rate, which is well below the suggested threshold of 10 ms in MU-MIMO Wi-Fi systems.

Example embodiments are described below with the following notation for mathematical expressions. Boldface uppercase letters denote matrices. The superscripts T and †· denote the transpose and the complex conjugate transpose (i.e., the Hermitian). The symbol ∠C defines the matrix containing the phases of the complex-valued matrix C. Moreover, diag($c_1$, . . . , $c_j$) indicates the diagonal matrix with elements ($c_1$, . . . , $c_j$) on the main diagonal. The ($c_1$, $c_2$) entry of matrix C is defined by [C]$c_1$,$c_2$, while $I_c$ refers to an identity matrix of size c×c and $I_{c \times d}$ is a c×d generalized identity matrix. The notations R and C indicate the set of real and complex numbers, respectively.

Figure 2:
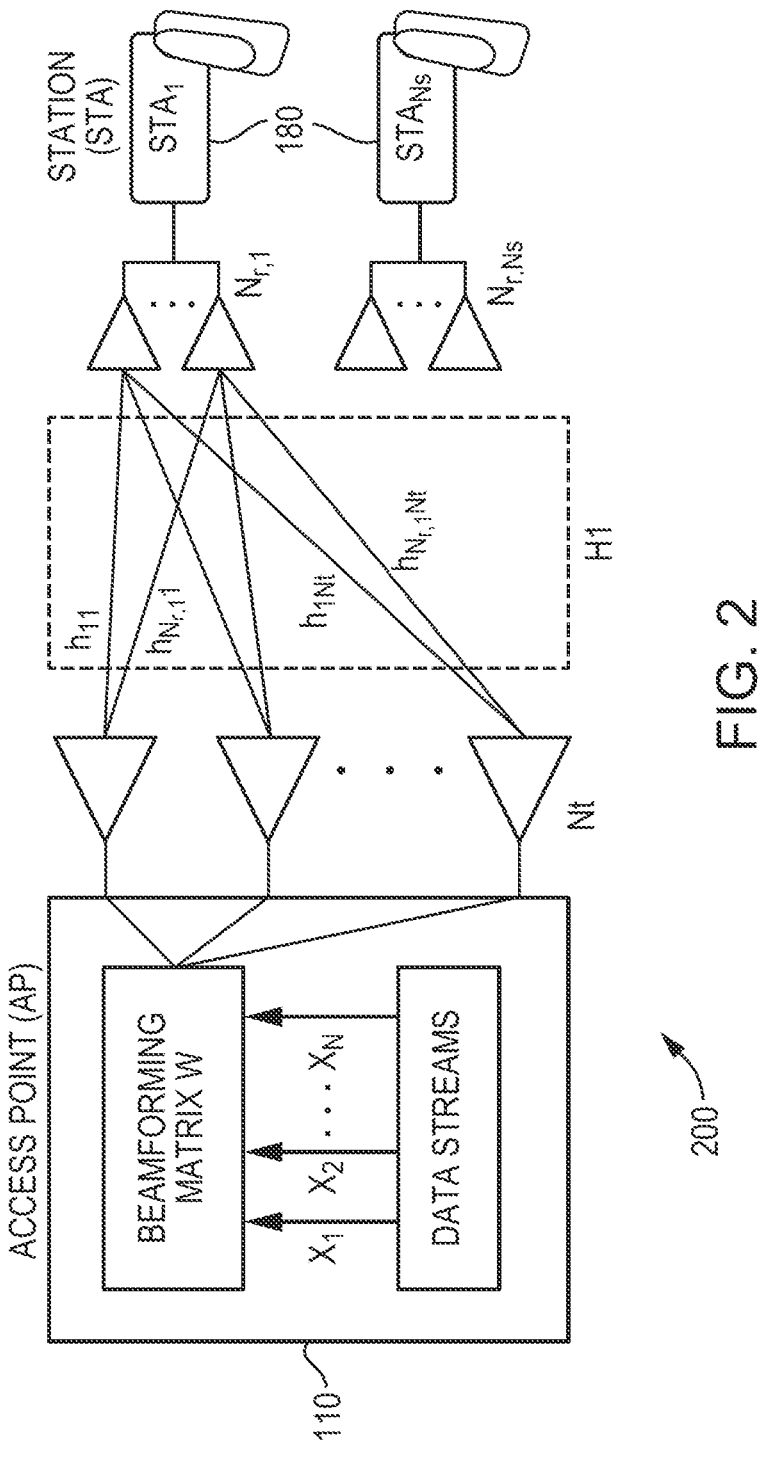
FIG. 2 is a diagram of a system including an access point in one embodiment.

FIG. 2 illustrates an example system 200 comprising the access point 110 (transmitter) in communication with the stations 180 (receivers). The system 200 may be a MUMIMO system with the access point 110 as the beamformer, and a set I of $N_s$ station 180 as beamformees. As shown, $N_t$ antennas are located at the access point 110 and $N_{r,i}$ antennas are at each receiver/client 180. $N_{ss,i}$ is the number of spatial streams for station i. Let $X_i(s) \in C^{Nss,i \times 1}$ represent the transmitted data symbol vector for user i over subcarrier s∈ S, where S is the set of S orthogonal frequency-division multiplexing (OFDM) subcarriers. Each data symbol vector is beamformed through a beamforming matrix (BM) denoted by $W_i(s) \in C^{Nt \times Nss,i}$. By defining the fading channel from the access point to station i as $H_i(s) \in C^{Nr,i \times Nt}$, the received signal at station i is:

$$Y_i = \sqrt{\frac{\rho}{N_t}}\left(H_iW_iX_i + \sum_{j \in I \setminus i} H_iW_jX_j\right) + N_i, \tag{1}$$

where $\rho$ denotes the signal-to-noise-ratio (SNR) and is assumed equal for all users. Ni is the complex additive white Gaussian noise (AGWN) for station i as CN(0, 1). To simplify notation, equation (1) is given in terms of the frequency domain for a single subcarrier and subcarrier index(s) is omitted. We assume the number of transmit antennas is set to be the sum total of all the used spatial streams:

$$N_t = \sum_{i \in I} N_{ss,i}$$

The first term in (1) denotes the desired signal and the second term is the inter-user interference, which can be eliminated due to the beamforming. Ideally, $H_i W_j = 0$ when $i \neq j$. Therefore, the received signal can be reduced to:

$$Y_i = \sqrt{\rho/N_t} \, H_i W_i X_i$$

Figure 3:
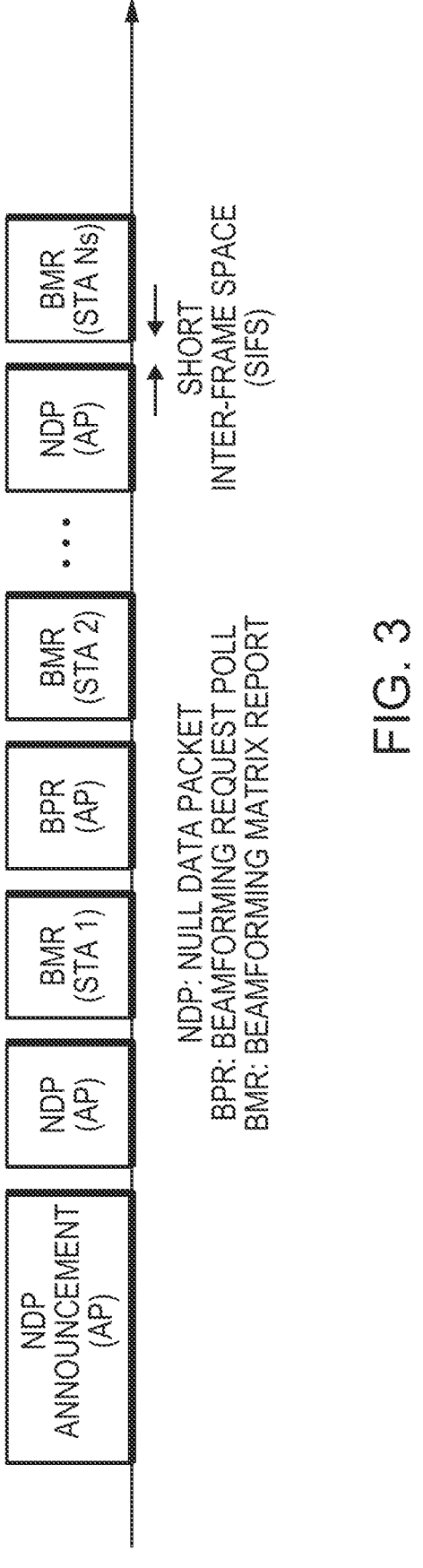
FIG. 3 is a diagram of communications exchanged between an access point and a station in one embodiment.

FIG. 3 is a diagram of communications exchanged between an access point and a station in one embodiment. In MU-MIMO Wi-Fi systems, the beamforming matrix W with dimension $$N_t \times \sum_{i=1}^{N_s} N_{ss,i} \times S$$

can be calculated using a multi-user channel sounding mechanism, as shown in FIG. 3. The procedure may include three main operations:

First, the access point may begin the process by transmitting a null data packet (NDP) announcement frame, used to gain control of the channel and identify the stations. The access point follows the NDP announcement frame with a NDP for each spatial stream. Second, upon reception of the NDP, each station i analyzes the NDP training fields—for example, VHT-LTF (Very High Throughput Legacy Training Field) in 802.11ac—and estimates the channel matrix $H_i(s)$ for all subcarriers s, which is then decomposed by using SVD:

$$H_i(s) = U_i(s) \cdot S_i(s) \cdot Z_i(s)^\dagger \tag{2}$$

where $U_i(s) \in C^{Nr,i \times Nr,i}$ and $Z_i(s) \in C^{Nt \times Nt}$ are unitary matrices, while the singular values are collected in the $N_{r,i} \times Nt$ diagonal matrix $S_i(s)$. With this notation, the complex-valued BM $V_i(s)$ is defined by collecting the first $N_{ss,i}$ columns of $Z_i(s)$. To simplify the notation, the i subscript can be dropped in favor of a generic receiver. To reduce the channel overhead, $V(s)$ is converted into polar coordinates as detailed in Algorithm 1, provided below. The output is matrices $D_{s,t}$ and $G_{s,l,t}$, defined as:

$$D_{s,t} = \begin{bmatrix} \mathbb{I}_{t-1} & 0 & & \cdots & 0 \\ 0 & e^{j\phi_{s,t,t}} & 0 & \cdots & \vdots \\ & 0 & \ddots & 0 & \\ \vdots & \vdots & 0 & e^{j\phi_{s,N_t-1,t}} & 0 \\ 0 & \cdots & & 0 & 1 \end{bmatrix}, \tag{3}$$

-continued $$G_{s,\ell,t} = \begin{bmatrix} \mathbb{I}_{t-1} & 0 & & \cdots & 0 \\ 0 & \cos\psi_{s,\ell,t} & 0 & \sin\psi_{s,\ell,t} & \\ & 0 & \mathbb{I}_{\ell-t-1} & 0 & \vdots \\ \vdots & -\sin\psi_{s,\ell,t} & 0 & \cos\psi_{s,\ell,t} & 0 \\ 0 & \cdots & & 0 & \mathbb{I}_{N_t-\ell} \end{bmatrix}, \tag{4}$$

The above equations (3) and (4) allow rewriting V(s) as:

$$V(s) = \tilde{V}(s) \cdot \tilde{D}(s) \tag{5}$$

with $$\tilde{V}(s) = \prod_{t=1}^{\min(N_{ss}, N_t-1)} \left( D_{s,t} \prod_{l=t+1}^{N_t} G_{s,l,t}^T \right) \cdot \mathbb{I}_{N_t \times N_{ss}},$$

In the $\tilde{V}(s)$ matrix, the last row (i.e., the feedback for the Ntth transmitting antenna) consists of non-negative real numbers by construction. Using this transformation, the station is only required to transmit the $\phi$ and $\psi$ angles to the access point. Moreover, the beamforming performance can be equivalent when using $V(s)$ or $\tilde{V}(s)$. Thus, the feedback for ~Dk is not fed back to the access point.

---

Algorithm 1: V(s) decomposition

---

Require: V(s);

$$\tilde{D}(s) = \text{diag}\!\left(e^{j\angle[V(s)]_{N_t,1}}, \ldots, e^{j\angle[V(s)]_{N_t,N_{ss}}}\right);$$

$\Omega(s) = V(s) \cdot \tilde{D}(s)^\dagger$;
for t ← 1 to min($N_{ss}$, $N_t$ − 1) do
  $\phi_{s,l,t} = \angle[\Omega(s)]_{l,t}$ with l = t, . . . , $N_t$ − 1;
  compute $D_{s,t}$ through Equation (3);

$$\Omega(s) \leftarrow D_{s,t}^\dagger \cdot \Omega(s);$$

for l ← t + 1 to $N_t$ do $$\psi_{s,\ell,t} = \arccos\!\left(\frac{[\Omega(s)]_{t,t}}{\sqrt{[\Omega(s)]_{t,t}^2 + [\Omega(s)]_{\ell,t}^2}}\right);$$

compute $G_{s,l,t}$ through Equation (4);
    $\Omega(s) \leftarrow G_{s,l,t} \cdot \Omega(s)$;

Third, the access point transmits a beamforming report poll (BRP) frame to retrieve the angles from each station. The angles are further quantized using $b_\phi \in \{7, 9\}$ bits for $\phi$ and $b_\psi = b_\phi - 2$ bits for $\psi$, to further reduce the channel occupancy. The quantized values—$q_\phi = \{0, \ldots, 2^{b\phi} - 1\}$ and $q_\psi = \{0, \ldots, 2^{b\phi} - 1\}$—are packed into a compressed beamforming frame (CBF). Each contains A number of angles for each of the S OFDM subchannels for a total of S·A angles each. For example, a 16×16 system with 320 MHz channels requires 256 complex elements for each of the 996 subcarriers. The 802.11 standard requires 8 bits for each real and imaginary component of the CBF, which results in 510 kB.

The size of the beamforming feedback (BF) grows as $$N_t \times \sum_{i=1}^{N_s} N_{ss,i} \times S$$

This grow implies the following challenges:
  a) Feedback airtime increases with the number of stations, as each station sends its BF separately. Moreover, the number of decomposed angles and ultimately the size of the BF depends on the number of antennas, and grows linearly with channel bandwidth.

b) Computing and compressing the through SVD and GR operations imposes a significant computational load on beamformees.

c) GR angle decomposition and BF reconstruction introduce an additional error. This deteriorates the performance of the multi-user transmission, especially in scenarios with small inter-user separation where successful data recovery depends highly on accurate beamforming.

d) The computational load at the station and the feedback size cannot be modified according to application-specific and device-specific constraints. As next-generation Wi-Fi caters to heterogeneous devices and a wide range of performance requirements, it is advantageous to achieve this functionality.

Figure 4:
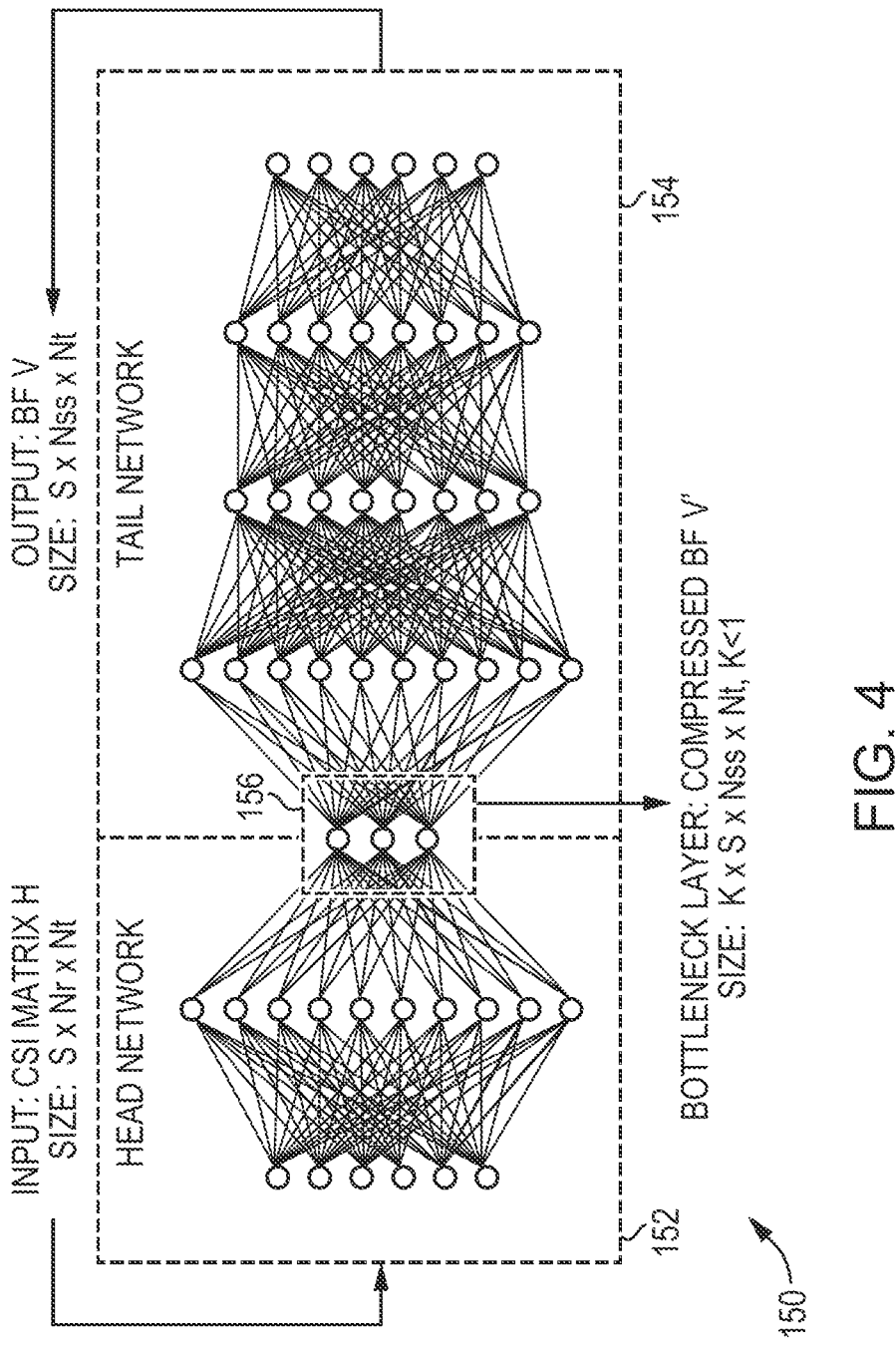
FIG. 4 is a diagram of a common neural network in one embodiment.

FIG. 4 is a diagram of a unified (also referred to as "common") neural network 150 in one embodiment. Example embodiments may train a DNN that maps the CSI matrix $H_i$ to the BF $V_i$ in a supervised manner. To compress the BF and transfer the stations computational load to the access point (with higher computational capacity), a "bottleneck layer" 156 may be implemented in the DNN as shown in FIG. 4. The bottleneck 156 may be an intermediate representation in the DNN model that is (K<1 times) smaller than the model input $H_i$. The bottleneck 156 divides the DNN into a head and a tail network, which are respectively executed on the station and the access point.

Figure 5:
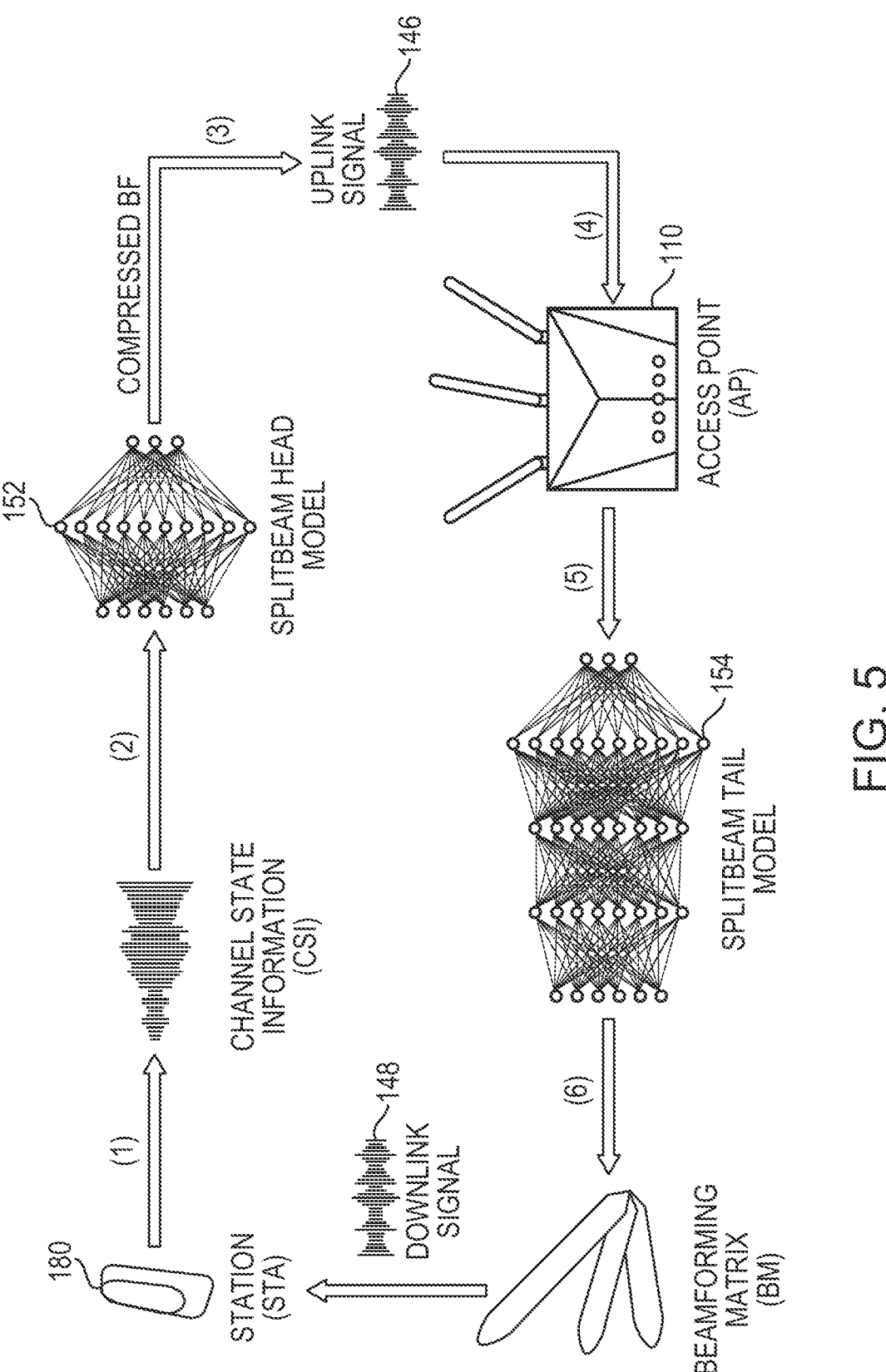
FIG. 5 is a flow diagram illustrating a beamforming feedback loop in one embodiment.

FIG. 5 is a flow diagram illustrating a beamforming feedback loop in one embodiment. (1) The estimated CSI matrices at stations 180 are fed to the head model 152 (2) that is tasked to produce a compressed representation of the BF denoted by $V'_i$(3). The compressed BF is sent to the access point 110 over the air (4), where it is fed to the tail model (5) to reconstruct the BF and generate the beamforming matrix (6) for sending a subsequent downlink signal 148 to the station 180.

The placement and size of the bottleneck ultimately determine the head network architecture, and thus (i) the station computational load, (ii) the BF feedback size, and (iii) the beamforming accuracy. Indeed, there is a trade-off between the complexity of the head model, the BF compression rate, and the accuracy of inference. While placing the bottleneck early on with a low number of nodes reduces the station computation load and airtime overhead, it leads to a decrease in beamforming accuracy, which ultimately increases the BER. Therefore, the bottleneck placement and size must be adjusted according to the application-specific requirements.

Bottleneck Optimization Problem (BOP)

The original DNN can be modeled as a function M that maps the channel matrix $H_i \in \mathbb{C}^{Nr \times Nt \times S}$ to the BF $V_i \in \mathbb{C}^{Nr \times Nt \times S}$ as $M(H; \theta):\mathbb{C}^H \rightarrow \mathbb{C}^V$, thorough L-layer transformations:

$$r_j = F_j(r_{j-1}, \theta_j) \quad 0 \le j \le L,$$

where $F_j(r_{j-1}, \theta_j)$ is the mapping carried out by the j-th layer and j=0 denotes the input layer. The vector $\theta = \{\theta_1, \ldots, \theta_L\}$ defines the set of parameters of the DNN. To devise the bottleneck, an encoder-decoder structure may be used, wherein the first e layers of the DNN is the encoder and the rest of the layers are the decoder.

The encoder, called the head model H, is placed from the input layer to the bottleneck B. Next, the tail model T decompresses the encoded BF to construct the BF $V_i$. The modified model can be written as $$M(H; \theta) = \begin{cases} \mathcal{H} = F_j(r_{j-1}, \theta_j), & 0 \le j < e, \\ \mathcal{B} = F_e(r_{e-1}, \theta_e), & j = e, \\ \mathcal{T} = F_j(r_{j-1}, \theta_j),) & e+1 \le j \le L. \end{cases} \tag{6}$$

Let $$L_i^H$$

(e,N) be the station i overhead consists of three components: (i) the computational cost (i.e., the power consumption and memory required for executing the model), denoted by $$L_i^c$$

(e,N); (ii) the execution time for BF compression through the head model, denoted by $$T_i^H$$

(e,N); and (iii) the power consumption of transmitting the compressed BF to the access point, denoted by $$L_i^{tx}$$

(e,N). Also, TA i (e,N) represents the compressed BF feedback airtime. Finally, TT (e,N) denotes the time required for reconstructing the BF at the access point. Notice that compression, decompression and airtime overhead depend on the placement e and size of the bottleneck N. The BOP may be defined such that it minimizes the station computation overhead and feedback airtime as $$\min_{e,N} \sum_{i \in I} \left( \mu_i^{\mathcal{H}} L_i^{\mathcal{H}}(e, N) + \left(1 - \mu_i^{\mathcal{H}}\right) \cdot T_i^A(e, N) \right) \tag{7a}$$

$$s.t. \ 0 < \mu_i^{\mathcal{H}} < 1, \ i \in I \tag{7b}$$

$$BER_i \le \gamma, \ i \in I \tag{7c}$$

$$\max_{i \in I} \left( T_i^{\mathcal{H}}(e, N) + T_i^{tx}(e, N) \right) + T^{\mathcal{T}}(e, N) < \mathcal{T}, \tag{7d}$$

where $$\mu_i^H$$

parameterizes the importance of reducing the stations overhead versus the feedback airtime. In applications where stations are resource-constrained, it is crucial to reduce the stations load, i.e., $$\mu_i^H > \mu_i^A.$$

On the other hand, in dynamic propagation environments like crowded rooms, where the channel coherence time is short, high feedback airtime cannot be tolerated. Thus, reducing the feedback airtime must be prioritized, i.e., $$\mu_i^H < \mu_i^A.$$

$BER_i$ represents the bit error rate (BER) of client i. As described herein, the accuracy of the generated BF is measured at the access point in terms of achievable BER by the stations. BER is the number of erroneous bits divided by the total number of transferred bits. Condition (7c) guarantees that the BER experienced by each client does not exceed the maximum BER threshold γ. Condition (7d) indicates that the maximum end-to-end delay of BF cannot exceed the maximum tolerable delay denoted by τ. In practice, these two conditions ensure that the bottleneck placement does not significantly impact the inference accuracy and latency. The maximum tolerable BER and delay can be specified according to the requirements.

Example Solution to BOP

The BOP is a particular instance of the extremely complex neural architecture search (NAS) problem. Example embodiments implement a heuristic algorithm to search for proper hyperparameters that is specific to our context. Specifically, to limit the search space, the following procedure may be used:

a) With the primary goal of minimizing the clients' computational load $$L_i^H,$$

the bottleneck layer can be placed immediately after the input layer (i.e., e=1);

b) To reduce the inference time at the access point, $T^H$, a single layer for the tail network (i.e., L=2) can be considered. Thus, the resulting DNN is a 3-layer network comprising input, bottleneck and output layers;

c) The size of the bottleneck layer may be adjusted according to the QoS requirements. Specifically, a limited number of compression levels $$K = V_i'/H_i,$$

and the BER as the QoS metric are considered. Beginning from the highest level of compression (lowest number of bottleneck nodes), train the 3-layer DNN may be trained with the CSI and corresponding V matrices dataset. Once trained, the generated BM by the DNN is used to estimate the BER at the station by comparing the recovered and transmitted data bits.

d) If the desired BER cannot be achieved, the compression level is decreased. The new model is trained according to step (3) until the model is capable of meeting the BER constraint. If the compression level is the minimum, another layer is inserted after the bottleneck (L=L+1), and the algorithm goes back to (c).

Model Training

Because H and I' are complex matrices, real and complex components can be decoupled in the matrices and treat them as double-sized real matrices. For each of our datasets, a dataset can be split into training, validation, and test splits with 8:1:1 ratio. Example embodiments may be trained offline for various network configurations and does not require retraining. The stations select the proper trained DNN according to the network configuration information acquired from the NDP preamble.

Loss Function: One goal is to deploy exactly the same model for each station without fine-tuning its parameters to its environment. The training process may be done offline (i.e., on a single computer). Given a channel matrix $H_i$, the DNN model M estimates the corresponding BF $V_i$, i.e., $V_i = M(H_i, \theta)$. We formulate the loss function L as follows:

$$\mathcal{L} = \frac{1}{b}\sum_{j=1}^{b}\sum_{i=1}^{N_S}\frac{(M(H_i^j, \theta) - V_i^j)^2}{\|V_i^j\|_1}, \tag{8}$$

where b indicates training batch size and $\|\cdot\|1$ represents L1-norm.

$$H_i^j \text{ and } V_i^j$$

indicate the j-th channel matrix and BF for station i, respectively. By minimizing the loss in equation (8), the parameters θ of our DNN model M can be optimized. A stochastic gradient descent (SGD) and Adam can be used to train the synthetic and experimental datasets, respectively. Unless specified, the models in this example are trained for 40 epochs, using the training split in the dataset with batch size of 16 and the initial learning rate of $10^{-3}$. The learning rate is decreased by a factor of 10 after the end of 20th and 30th epochs. Using the validation split in the dataset, the model can be assessed in terms of achieved BER at the end of every epoch and save the best parameters θ* such that achieve the lowest BER for the validation split. The trained model is assessed with the best parameters for the held-out test split in the dataset and report the test BER.

Difference with Autoencoders: Although an AE is similar in terms of model architecture, its training objective is different. AEs are trained to reconstruct its input in an unsupervised manner (e.g., to estimate $\tilde{V}_i$ given $V_i$). Conversely, a task-specific model may be trained in a supervised fashion to estimate BF $V_i$ given a channel matrix $H_i$.

Figure 6:
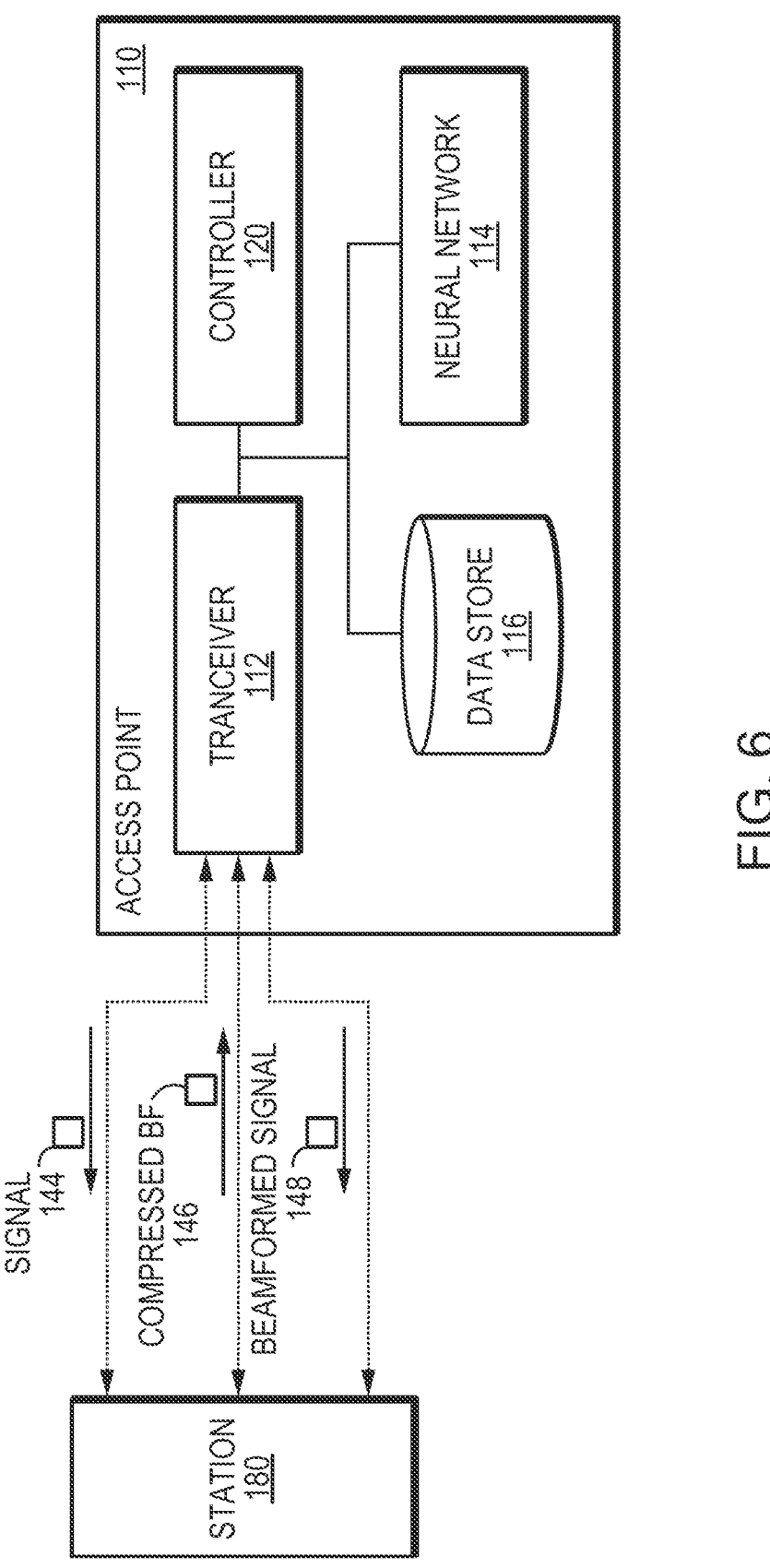
FIG. 6 is a block diagram of an access point in one embodiment.

FIG. 6 illustrates the access point 110 in further detail. The access point 110 may include a transceiver 112 for performing wireless communications (e.g., omnidirectional and beamformed) with the station 180. A controller 120 may be coupled to the transceiver 112 and may manage communications by the transceiver 112, for example by configuring and updating the beamforming matrix used by the transceiver 112. The neural network 114 may operate a subset of the unified NN model 150 described above, for example the tail model 154 of FIG. 4, a representation of which may be stored at a data store.

Figure 7:
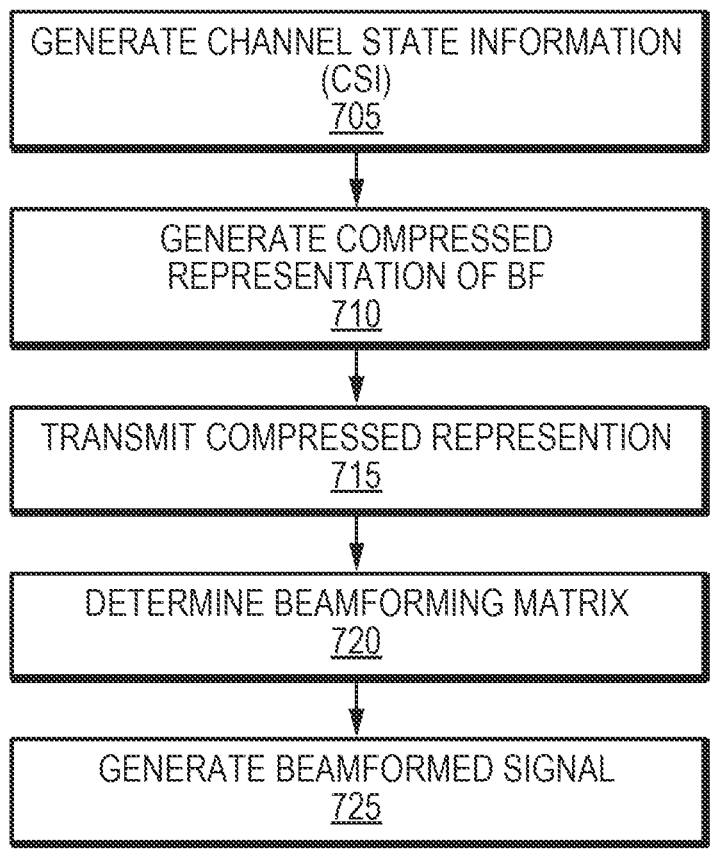
FIG. 7 is a flow diagram of a process of configuring a beamformed signal in one embodiment.
Figure 7:

FIG. 7 is a flow diagram of a process 700 of configuring a beamformed signal. With reference to FIG. 6, the transmitter 110 may generate beamformed signals and omnidirectional signals for reception by the station 180. In particular, the transceiver 112 may transmit a signal 144 (omnidirectional or beamformed) from which channel state information (CSI) can be derived. Upon receipt of the signal 144, the station 180 may generate the CSI based on the received signal 144 (705), and then generate, via a first NN (e.g., the head network 152 of FIG. 4), a compressed representation of beamforming feedback as a function of the CSI (710). The station 180 may then transmit the compressed representation 146 to the access point 110 via a wireless channel (715). The access point 110 may then determine, via a second NN 114 (e.g., the tail network 154 of FIG. 4), the beamforming matrix as a function of the compressed representation (720). Using the beamforming matrix, the controller 120 may update a beamforming configuration for the transceiver 112 for subsequent beamformed communications with the station 180, for example by replacing a previous beamforming matrix with the newly-generated beamforming matrix. The transceiver may then generate a subsequent beamformed signal 148 toward the receiver as a function of the beamforming matrix (725).

Complexity Analysis and Compression Rate

Computational Overhead: The complexity of the SVD operation for decomposing the BF V in 802.11 is $$O\big((4N_tN_r^2 + 22N_t^3)S\big).$$

The BF is further transformed into a set of angles using the Givens rotation (GR) matrix multiplication which has a complexity of $$O\big(N_t^3 N_r^3 S\big).$$

Conversely, the complexity of an example embodiment is $$O\big(K N_t^2 N_r^2 S^2\big),$$

where K<1 denotes the head model's compression level.

Figure 8:
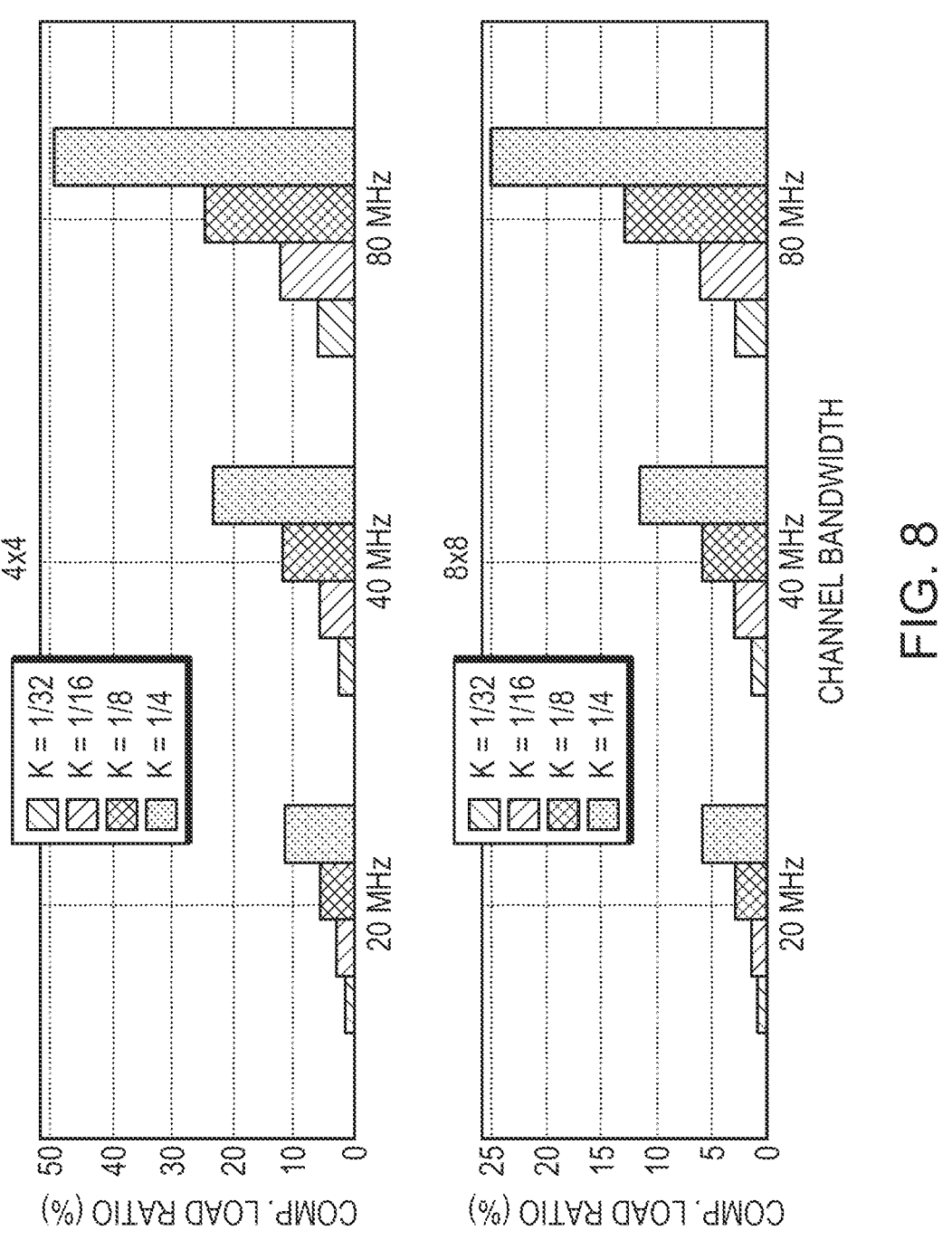
FIG. 8 is a chart illustrating computational overhead in one embodiment.

FIG. 8 illustrates, for an example embodiment, the ratio of the number of floating-point operations (FLOP) required for compressing the BF using example embodiments to 802.11 compression technique. The ratio is calculated by X/Y×100 where X and Y denote the number of floating points operation in example embodiments and legacy Wi-Fi protocol, respectively. The comparison is performed for different MU-MIMO orders and a various number of subcarriers, as computed through a MATLAB program. Example embodiments noticeably reduce the computational load of station, particularly as the number of antennas and/or stations increases. At 80 MHz, example embodiments with K=⅛ decreases 75% and 87% of the station's load in 4×4 and 8×8 systems. On average, example embodiments have been demonstrated to improve computation by 73%. Further, example embodiments with K=⅛ can keep the BER within 87% of 802.11.

Airtime Overhead: In 802.11, the size of the compressed BF report is BMR=8×$N_t$+$N_a$×S×($b_\phi$+$b_\psi$)/2 where $N_a$ denotes the number of Givens angles. Values $b_\phi$ and $b_\psi$ are the number of bits required for the angle quantization. Therefore, the 802.11 compression ratio can be written as $$CR = \frac{BMR}{S \times N_t \times N_r \times b}, \qquad (9)$$

where b=16 is the number of bits required for transmitting channel information over each subcarrier. Conversely, the compression rate of example embodiments is K, which is constant and does not grow with the size of the channel matrix.

Figure 9:
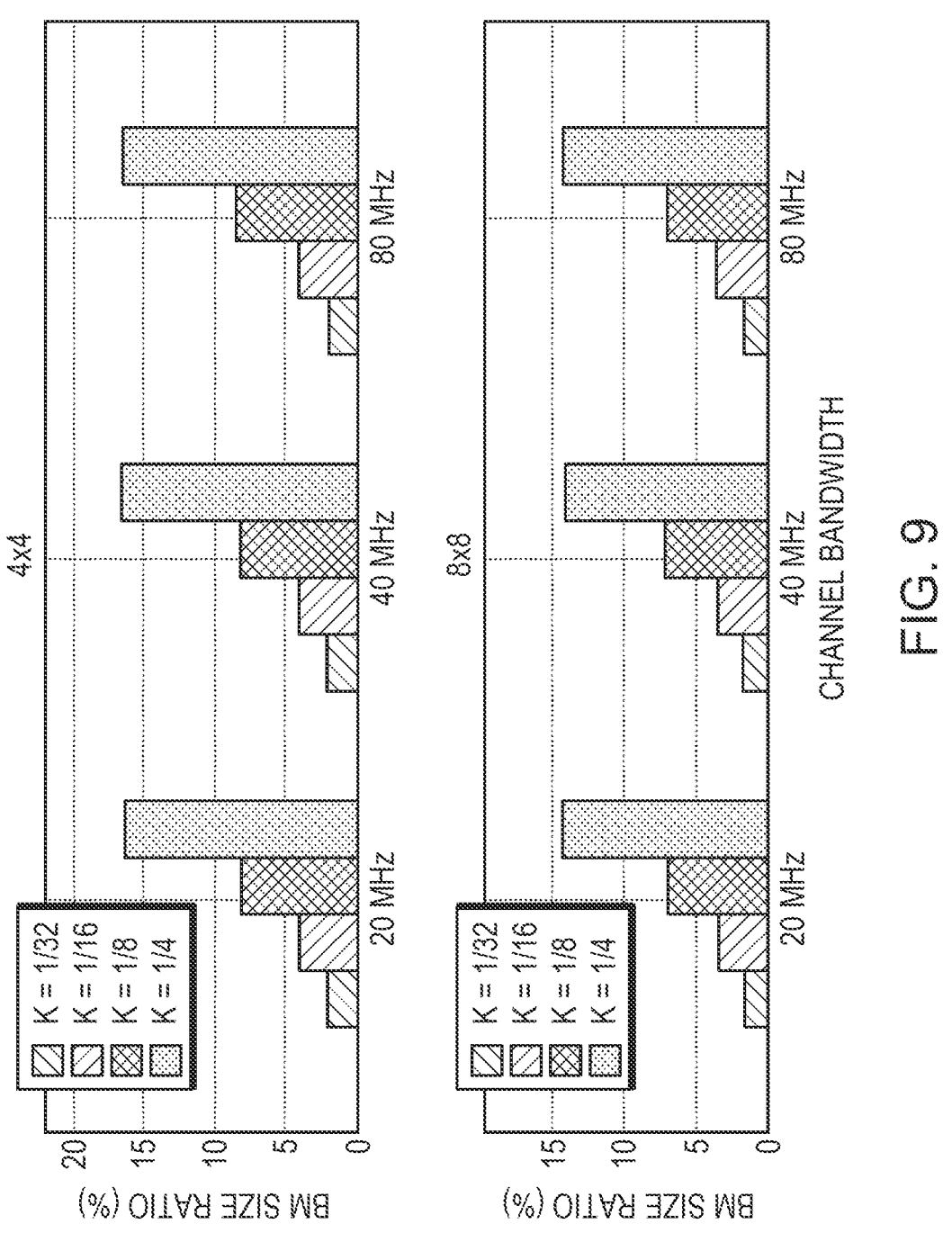
FIG. 9 is a chart illustrating compression ratio of a beamforming matrix in one embodiment.

FIG. 9 depicts the impact of an example embodiment in reducing the airtime overhead. The bars show the ratio of the size of the compressed BF of example embodiments to the angle decomposition technique in 802.11. Example embodiment have a significant impact at higher-order MU-MIMO configurations. For example, such embodiments may reduce the size of the feedback overhead by 91% and 93% in 4×4 and 8×8 configurations with 80 MHz channel. On average, example embodiments have been demonstrated to reduce the airtime overhead by 75% with respect to 802.11.

While example embodiments have been particularly shown and described, it will be understood by those skilled in the art that various changes in form and details may be made therein without departing from the scope of the embodiments encompassed by the appended claims.

What is claimed is:

1. A wireless communications network, comprising:
a transmitter configured to generate beamformed signals and omnidirectional signals; and
a receiver communicatively coupled to the transmitter via a wireless channel, the receiver configured to:
    generate channel state information (CSI) based on a received signal from the transmitter;
    generate, via a first neural network (NN), a compressed representation of beamforming feedback as a function of the CSI; and
    transmit the compressed representation to the transmitter via the wireless channel;
the transmitter being further configured to:
    determine, via a second NN, the beamforming matrix as a function of the compressed representation; and
    generate a subsequent beamformed signal toward the receiver as a function of the beamforming matrix.

2. The network of claim 1, wherein the first and second NNs each operate a distinct subset of a common NN model, the common NN model being configured to output the beamforming matrix in response to an input comprising the CSI.

3. The network of claim 2, wherein the distinct subsets of the common NN model include:
a first subset configured to output the compressed representation in response to an input comprising the CSI, and
a second subset configured to output the beamforming matrix in response to an input comprising the compressed representation.

4. The network of claim 2, wherein the common NN model includes an intermediate layer between the distinct subsets, the intermediate layer outputting the compressed representation in response to an input comprising the CSI.

5. The network of claim 1, wherein the transmitter is further configured to update a beamforming configuration based on the beamforming matrix.

6. The network of claim 1, wherein the transmitter is further configured to generate the subsequent beamformed signal via an antenna array.

7. The network of claim 1, wherein the transmitter is further configured to generate the subsequent beamformed signal via a multiple-input and multiple-output (MIMO) process.

8. The network of claim 1, wherein the compressed representation is less than 50% of the data size of the beamforming feedback.

9. The network of claim 1, wherein the received signal is an omnidirectional signal.

10. The network of claim 1, wherein the received signal is a beamformed signal.

11. A method of wireless communication, comprising:
at a receiver communicatively coupled to a transmitter via a wireless channel:
generating channel state information (CSI) based on a received signal from the transmitter;
generating, via a first neural network (NN), a compressed representation of beamforming feedback as a function of the CSI; and
transmitting the compressed representation to the transmitter via the wireless channel; and
at the transmitter:
determining, via a second NN, the beamforming matrix as a function of the compressed representation; and
generating a subsequent beamformed signal toward the receiver as a function of the beamforming matrix.

12. The method of claim 11, wherein the first and second NNs each operate a distinct subset of a common NN model, the common NN model being configured to output the beamforming matrix in response to an input comprising the CSI.

13. The method of claim 12, wherein the distinct subsets of the common NN model include:
a first subset configured to output the compressed representation in response to an input comprising the CSI, and
a second subset configured to output the beamforming matrix in response to an input comprising the compressed representation.

14. The method of claim 12, wherein the common NN model includes an intermediate layer between the distinct subsets, the intermediate layer outputting the compressed representation in response to an input comprising the CSI.

15. The method of claim 11, further comprising updating a beamforming configuration based on the beamforming matrix.

16. A network transmitter, comprising:
a transceiver configured to:
generate a beamformed signal toward a receiver, and
receive a compressed representation of beamforming feedback from the receiver, the compressed representation being a function of channel state information (CSI) determined by the receiver; and
a neural network (NN) configured to generate the beamforming matrix as a function of the compressed representation;
the transceiver further configured to generate a subsequent beamformed signal toward the receiver as a function of the beamforming matrix.

17. The transmitter of claim 16, wherein the neural network operates a subset of a common NN model, the common NN model being configured to output the beamforming matrix in response to an input comprising the CSI.

18. The transmitter of claim 17, wherein the distinct subsets of the common NN model include:
a first subset configured to output the compressed representation in response to an input comprising the CSI, and
a second subset configured to output the beamforming matrix in response to an input comprising the compressed representation.

19. The transmitter of claim 17, wherein the common NN model includes an intermediate layer between the distinct subsets, the intermediate layer outputting the compressed representation in response to an input comprising the CSI.

20. The transmitter of claim 16, wherein the transmitter is further configured to update a beamforming configuration based on the beamforming matrix.

21. The transmitter of claim 16, wherein the compressed representation is less than 50% of the data size of the beamforming feedback.

* * * * *